United States Patent [19]

Mitani et al.

[11] Patent Number: 4,850,424

[45] Date of Patent: Jul. 25, 1989

[54] HEAT ACCUMULATOR

[75] Inventors: Akio Mitani; Koji Kashima; Hiroichi Yamaguchi, all of Yokohama, Japan

[73] Assignee: Kabushiki Kaisha Toshiba, Kawasaki, Japan

[21] Appl. No.: 149,078

[22] Filed: Jan. 27, 1988

[30] Foreign Application Priority Data

Jan. 31, 1987 [JP] Japan ................................ 62-21046

[51] Int. Cl.⁴ .............................................. F28D 20/00
[52] U.S. Cl. ...................................... 165/10; 165/12; 165/14; 126/263
[58] Field of Search ...................... 165/104.11, 10, 13, 165/12; 126/263

[56] References Cited

U.S. PATENT DOCUMENTS 2,289,425  7/1942  Hogan ................................ 126/263

FOREIGN PATENT DOCUMENTS 96854  7/1980  Japan ................................ 165/10

Primary Examiner—Albert W. Davis, Jr.
Attorney, Agent, or Firm—Cushman, Darby & Cushman

[57] ABSTRACT

A heat accumulator includes a heat storage tank and a latent heat accumulating material which fills the tank. The heat accumulating material remains in a stable supercooled condition at temperatures lower than a predetermined phase transformation temperature, and is released from the supercooled condition by a releasing device. The releasing device includes a holding member, which is mounted on the storage tank such that it is capable of touching the accumulating material and which holds a seed material. A driving mechanism drives the holding member so that the seed material comes into contact with the heat accmulating material for a predetermined period of time, releasing the latter from its supercooled condition.

13 Claims, 4 Drawing Sheets

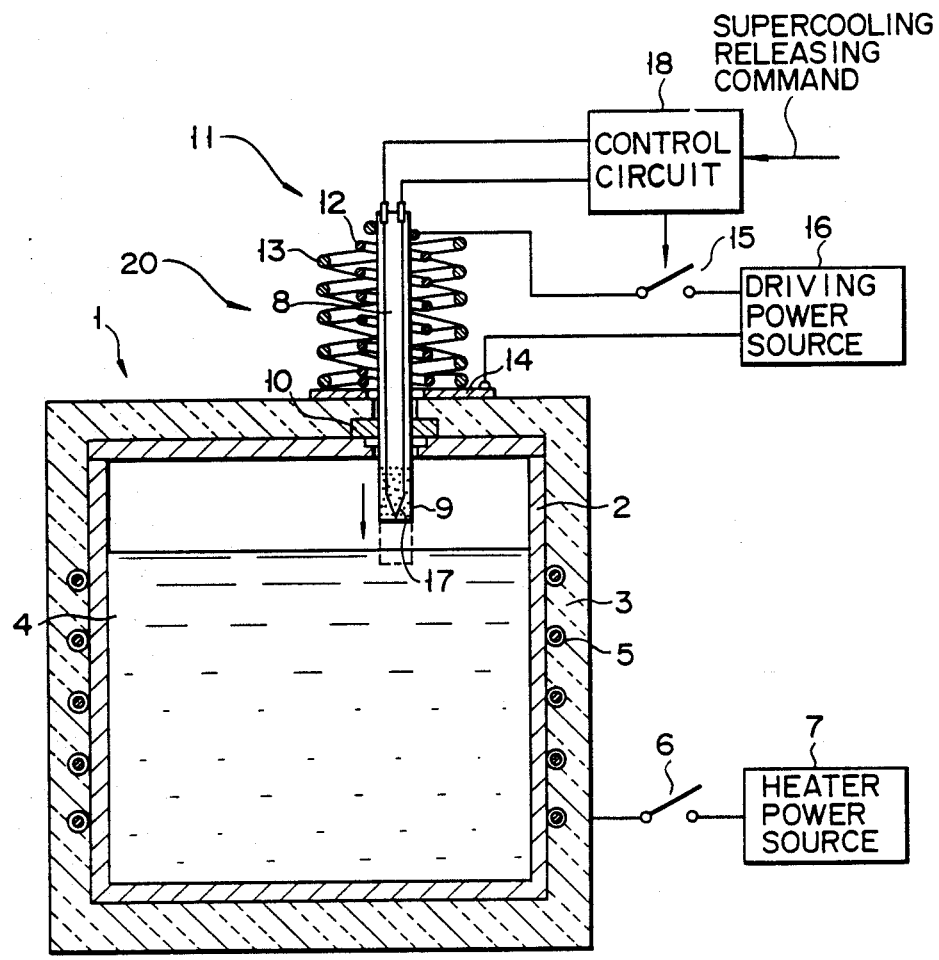
F I G. 1

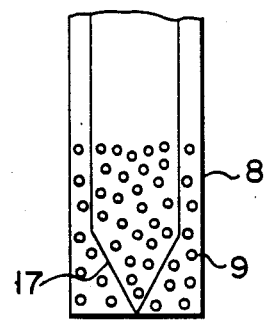
F I G. 2
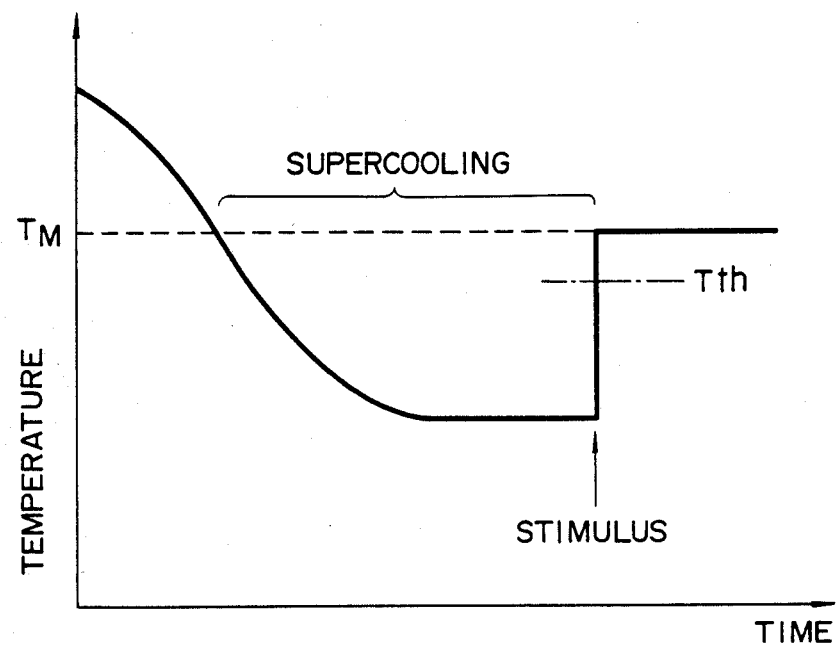
F I G. 3

HEAT ACCUMULATOR

BACKGROUND OF THE INVENTION

This invention relates to a heat accumulator and more particularly to a heat accumulator using a latent heat accumulating material which holds a stable supercooled condition at temperatures lower than the phase transformation temperature.

Heat accumulators, for storing heat energy and releasing it for use when required, fall into two categories: one type uses a sensible heat accumulating material, while the other type uses a latent heat accumulating material. A typical latent heat accumulating material discharges heat energy in accordance with a phase transformation thereof and has a heat accumulating density of about three to five times that of sensible heat accumulating material. As a result, heat accumulators using a latent heat accumulating material have an advantage in that they can be constructed in a compact form.

A well-known type of latent heat accumulating material is made of a substance which does not solidify and holds a stable supercooled condition at temperatures lower than the phase transformation temperature; for example, a sodium acetate-base hydrate. This material discharges its latent heat when it is released from supercooled condition and transformed from the liquid phase to the solid phase. Using this method, heat energy can be obtained from this heat accumulating material any time it is required.

To release this type of latent heat accumulating material from the supercooled condition, all that is normally necessary is to give an adequate stimulus to the latent heat accumulating material in supercooled condition. These supercooling release methods giving a stimulus include (1) touching the heat accumulating material with a sharp metal rod, (2) applying a voltage to the heat accumulating material via an electrode, and (3) adding a seed material to the heat accumulating material.

In the case of methods (1) and (2), however, the forming mechanism of a nucleus necessary for a release from the supercooled condition has not been fully clarified. In fact, with these methods, the heat accumulating material sometimes cannot be released from supercooled condition even if it is given a stimulus and therefore, they lack reliability.

On the other hand, method (3), which adds a nucleus necessary for the termination of supercooling, does ensure certain release from the supercooled condition. However, the seed material added to the heat accumulating material gradually accumulates therein, and eventually causes a separation of its phases, with the result that the heat accumulating material can no longer remain in a stable supercooled condition.

As described above, among the conventional supercooling releasing methods, those which give a mechanical or electrical stimulus lack reliability, while use of those which entail addition of a seed material result in degradation of the physical properties of the heat accumulating material.

SUMMARY OF THE INVENTION

The present invention has been conceived in consideration of the above situation and has as its object to provide a heat accumulator the use of which ensures with certainty the releasing of a latent heat accumulating material from its supercooled condition but without causing degradation of the physical properties of the accumulating material.

To achieve the above object, a heat accumulator according to this invention comprises a heat storage tank; a latent heat accumulating material filled in the heat storage tank and capable of holding a stable supercooled condition at temperatures lower than a predetermined phase transformation temperature; and releasing means for releasing the heat accumulating material from supercooled condition, the releasing means having a holding member provided at the heat storage tank in a manner capable of contacting the heat accumulating material, a seed material made of the same kind of material as the latent heat accumulating material and held by the holding member, and driving means for driving the holding member to bring the seed material into contact with said heat accumulating material for a predetermined period of time.

BRIEF DESCRIPTION OF THE DRAWINGS

FIGS. 1 through 3 are views and a graph of a heat accumulator according to an embodiment of this invention; in which FIG. 1 is a sectional view showing the whole of the heat accumulator, FIG. 2 is an enlarged view showing a head portion of a hold member, and FIG. 3 is a graph showing the heating and cooling characteristics of a latent heat accumulating material;

DETAILED DESCRIPTION OF THE PREFERRED EMBODIMENTS

Figure 4:
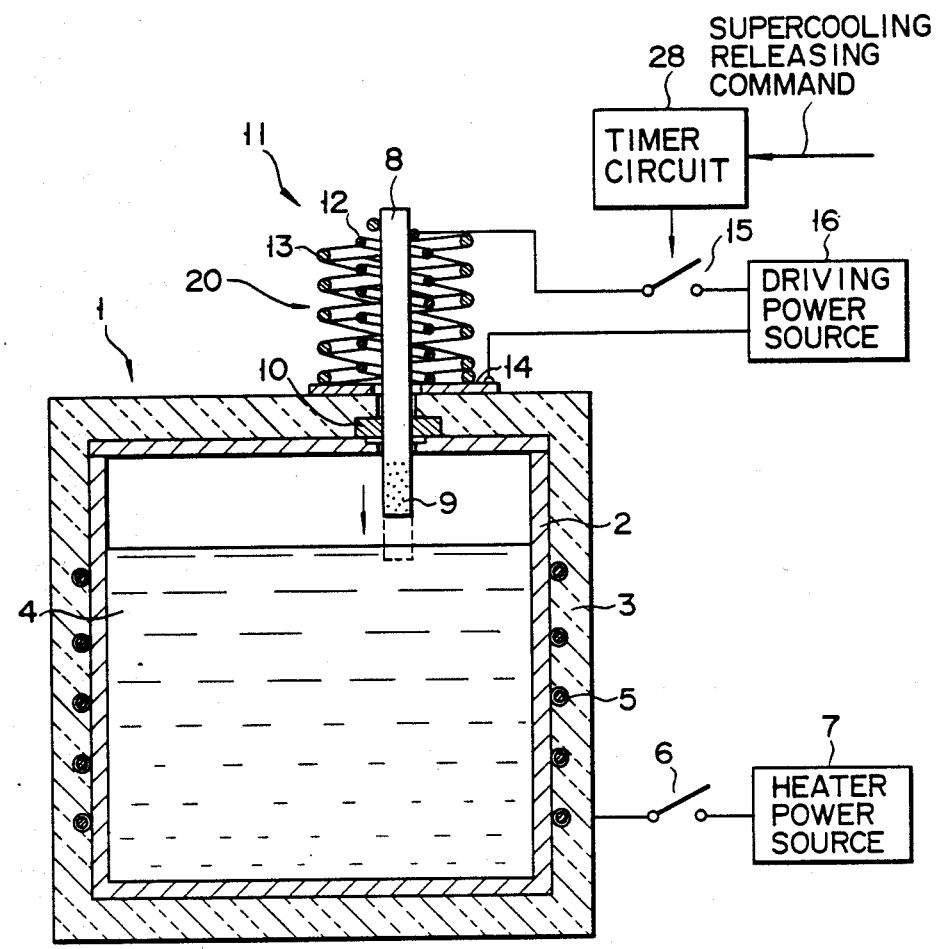
FIG. 4 is a sectional view showing the whole of a heat accumulator according to another embodiment of the invention.

Preferred embodiments of this invention will now be described in detail with reference to the accompanying drawings.

As is shown in FIG. 1, a heat accumulator has heat storage tank 1 which comprises metal container 2 containing latent heat accumulating material 4, an electric heater, e.g., sheath heater 5, wound around the metal container, for heating accumulating material 4, and heat insulating vessel 3 surrounding the outer surface of container 2 and heater 5. Heater 5 is connected through switch 6 to heater power source 7. A practical example of latent heat accumulating material is a solution of sodium acetate tri-hydrate with 1-2% of xanthan gum added as a thickener.

The heat accumulator is equipped with supercooling releasing device 20 for releasing accumulating material 4 from supercooled condition by bringing a seed material into contact with accumulating material 4. Releasing device 20 has rod-like holding member 8 holding seed material 9. Holding member 8 is mounted on heat storage tank 1 in a manner that it can move perpendicularly to the liquid surface of heat accumulating material 4 and its lower end can come into contact with the heat accumulating material. As is shown in FIGS. 1 and 2, holding member 8 is formed of a porous material, such as a polymeric material, and holds powdery seed material 9 (sodium acetate tri-hydrate) in the pores of its lower end portion. This holding member is formed, for example, by melting a thermoplastic resin, mixing the resin with a powdery seed material, and solidifying the mixture. Provided between holding member 8 and heat storage tank 1 is seal 10 which seals off the inside of the heat storage tank airtightly.

In holding member 8, there is provided temperature sensor 17 as a detecting means for detecting a contact of the holding member with heat accumulating material 4. Sensor 17 consists of a thermocouple, one end extends to the lower end of holding member 8 and the other end protrudes outside from the upper end of the holding member and is connected through a lead wire to control circuit 18.

Supercooling releasing device 20 has driving means for driving holding member 8 vertically. This driving means includes bias spring 13 and another spring 12 which is made of a shape memory alloy. The upper ends of springs 12 and 13 are fixed to holding member 8. The lower end of spring 12 is in contact with and fixed to electrode 14 secured to the upper surface of heat storage tank 1, and the lower end of bias spring 13 is fixed directly to the upper surface of tank 1. The upper end of spring 12 is connected through switch 15 to one end of driving power source 16 and the lower end is connected through electrode 14 to the other end of driving power source 16. Switch 15 is under on-off control by control circuit 18.

Latent head accumulating material 4 filled in heat storage tank 1 has the heating and cooling characteristics as indicated in FIG. 3. Heat accumulating material 4 becomes liquid when it is heated to a temperature above the phase transformation temperature (melting point) $T_M$ (about 59° C.). However, when the heat accumulating material is cooled from the molten state to a temperature below $T_M$, it does not solidify even though its temperature falls and passes the $T_M$ point and holds a stable liquid state, that is, the supercooled condition until a temperature below $T_M$, $-10°$ C. for example, is reached. When supercooled heat accumulating material 4 is given a stimulus by contact with seed material 9 which will be described later, the part in contact with the seed material is released from the supercooled condition and the release from supercooled condition propagates to the whole body of the heat accumulating material. Consequently, heat accumulating material 4 radiates heat.

The operation of the thus constructed heat accumulator will be described.

When heat accumulating material 4 is solid, it is heated through container 2 to a temperature above the phase transformation temperature $T_M$ by closing switch 6 and supplying power to heater 5 or by some sort of waste heat. As a result, heat accumulating material 4 becomes liquid. Then, heat accumulating material 4 is left to stand and cooled by the atmospheric air through heat insulating layer 3. However, heat accumulating material 4 is held by the effect of heat insulating layer 3 at a temperature higher than the critical supercooling temperature. Therefore, heat accumulating material 4 is supercooled and holds latent heat.

When the latent heat stored in heat accumulating material 4 is used, a supercooling releasing command is given to control circuit 18. Then, control circuit 18 turns on switch 15 so as to cause driving power source 16 to supply power to spring 12, thereby heating the spring. When being heated to a temperature above a specified transformation temperature, spring 12 starts to contract by its shape memory effect. Consequently, holding member 8 lowers and its lower end portion is dipped about 1 to 2 mm in heat accumulating material 4. As a result, seed material 9 held at the lower end portion of holding member 8 comes into contact with heat accumulating material 4, and the touched part of the heat accumulating material is immediately released from the supercooled condition, thus beginning to solidify. At the same time, the release from supercooling propagates from the part touched by seed material 9 to the whole of heat accumulating material 4. When solidifying, heat accumulating material 4 radiates the latent heat which has been stored therein.

As heat accumulating material 4 radiates the latent heat, its temperature rises. Temperature sensor 17 placed in holding member 8 detects a temperature rise of heat accumulating material 4 and outputs a detection signal to control circuit 18. According to a detection signal from sensor 17, control circuit 18 finds that seed material 9 is in contact with heat accumulating material 4. More specifically, as is shown in FIG. 3, when heat accumulating material 4 is released from supercooled condition by the contact with seed material 9 as a stimulus, the temperature of heat accumulating material 4 rises and reaches the phase transformation temperature $T_M$. Control circuit 18 finds that seed material 9 has touched heat accumulating material 4 based on the fact that the temperature detected by sensor 17 exceeds a specified temperature Tth lower than the phase transformation temperature $T_M$.

On finding seed material 9's touching heat accumulating material 4, control circuit 18 turns off switch 15 to stop power supply to spring 12. Therefore, spring 12 decreases in temperature. When the shape memory effect of spring 12 goes off, spring 12 is caused to extend by the urging force of spring 13. At the same time, holding member 8 is moved upward and thus separated from heat accumulating material 4.

With the heat accumulator constructed as described above, the supercooled condition of the heat accumulating material is terminated by bringing seed material 9 held by holding member 8 into contact with heat accumulating material 4. This heat accumulator has extremely high reliability compared with those heat accumulators which terminates supercooling by a mechanical or electrical stimulus. In this heat accumulator, seed material 9 to touch heat accumulating material 4 is held by holding member 8, so that it is possible to prevent the problem that the heat accumulating material is deteriorated by the addition and accumulation of the seed material in the heat accumulating material. Further, holding member 8 is so constructed that it is withdrawn from the heat accumulating material immediately after material 4 is released from the supercooled condition. Hence, even when heat accumulating material 4 solidifies quickly after the termination of supercooling, there is no possibility that holding member 8 is arrested by the heat accumulating material and the holding member can be pulled out smoothly. This makes it possible to prevent seed material 9 itself and the heat accumulating material from deteriorating by the melting of seed material 9 by the heat radiated from heat accumulating material 4, resulting from the termination of supercooling. Also, it is possible to prevent another problem that the adhesion of the thickener in heat accumulating material 4 to seed material 9 impairs the stimulating action of the seed material, that is to say, the seed material cannot touch the heat accumulating material. Therefore, it is possible to subject the heat accumulating material to repeated execution of supercooling and its release over an extended period of time.

In the above embodiment, driving power source 16 is used to energize spring 12. A voltage of about 1.2 V will suffice. An advantage resulting from this is that driving power source 16 may be small and therefore, the whole unit of heat accumulator can be compact in size.

FIG. 4 shows a second embodiment of this invention. In this embodiment, temperature sensor 17 used in the first embodiment described above is excepted and timer circuit 28 is used in place of control circuit 18. Another construction is the same as in the first embodiment and its detailed description will be omitted.

According to the second embodiment of this invention, when receiving a supercooling releasing command, timer circuit 28 keeps switch 15 turned on for a given period of time and energizes spring 12 only for this period. Therefore, if a desired operation time of timer circuit is selected, seed material 9 can be pulled automatically out of heat accumulating material 4 after allowing the seed material to touch the heat accumulating material for a period of time necessary for releasing the heat accumulating material from the supercooled condition. This means that contact detecting means such as a temperature sensor is not necessary and the manufacturing cost of heat accumulators can be reduced.

Figure 5:
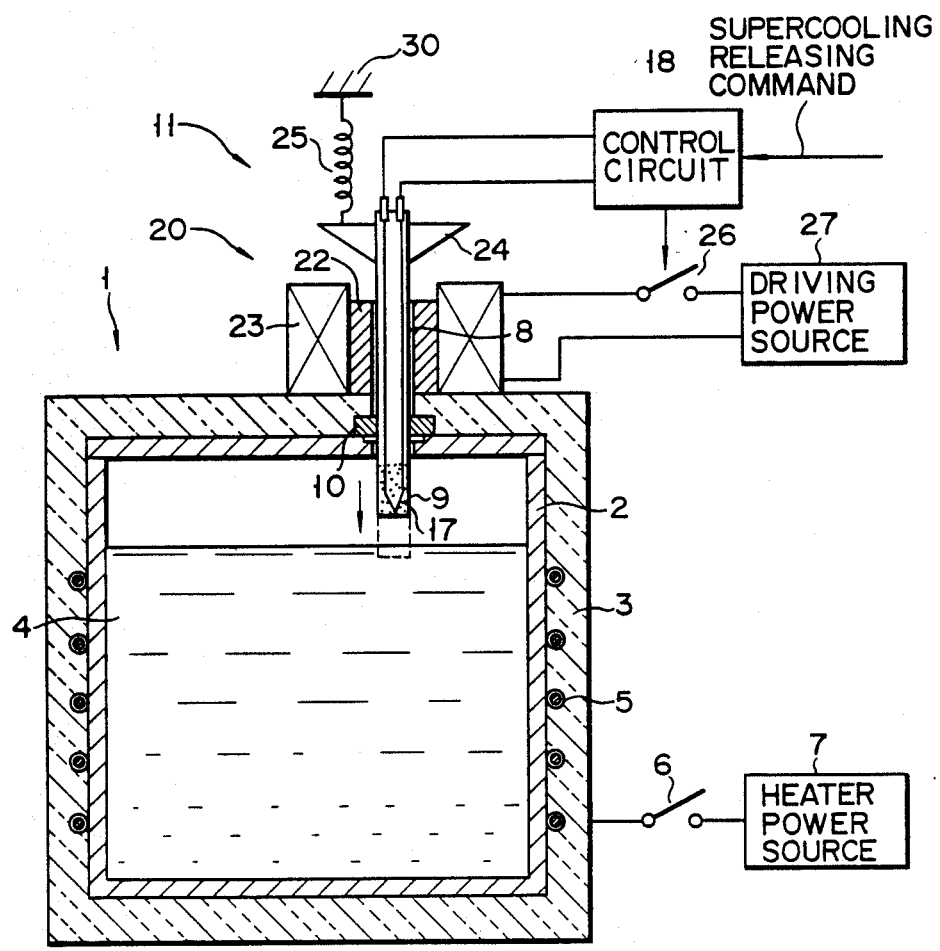
FIG. 5 is a sectional view showing the whole of a heat accumulator according to still another embodiment of the invention.

FIG. 5 shows a third embodiment of this invention. In this embodiment, driving means 11 for moving holding member 8 differs in construction from that of the first embodiment. That is to say, holding member 8 is inserted in tubular guide 22 secured to the top surface of heat storage tank 1, and the holding member moves vertically with being guided by this tubular guide. Annular electromagnet 23 is attached to the outer periphery of tubular guide 22 and connected through switch 26 to driving power source 27. Fixed to the upper end portion of holding member 8 is magnetic piece 24 which is opposed to electromagnet 23. Magnetic piece 24 should preferably be a permanent magnet. Magnetic piece 24 is connected through return spring 25 to support 30.

In the third embodiment constructed as described above, when heat accumulating material 4 is released from the supercooled condition, control circuit 18 turns on switch 26 so that power is supplied to electromagnet 23 from driving power source 27. Hence, magnetic piece 24 is attracted by electromagnet 23 and moves downward with holding member 8. As a result, seed material 9 held by the lower end portion of holding member 8 touches heat accumulating member 4, thus releasing the heat accumulating material from the supercooled condition. As in the first embodiment, according to a detection result by temperature sensor 17, control circuit 18 turns off switch 26, with the result that power supply to electromagnet 23 is stopped. Consequently, holding member 8 and magnetic piece 24 are raised by return spring 25.

With the second embodiment constructed as set forth above, the same effect as in the first embodiment can be obtained.

It is understood that the present invention is not limited to the above preferred embodiments, and that various changes and modifications may be effected therein by one skilled in the art within the scope of this invention.

To take an example, the holding member and the seed material need not be formed in an integrated body, but a piece containing a seed material may be fixed to the head of the holding material.

Further, means for detecting the seed material's contact with the heat accumulating material need not be a temperature sensor, but may be a pressure sensor. The contact detecting means has only to touch the heat accumulating material and may be mounted on the surface of the holding member. In the third embodiment, the control circuit may be replaced by a timer circuit and the temperature sensor may be removed as in the second embodiment.

What is claimed is:

1. A heat accumulator comprising:
    a heat storage tank;
    a latent heat accumulating material filling the heat storage tank and capable of remaining in a stable supercooled condition at temperatures lower than a specified phase transformation temperature; and
    releasing means for releasing the latent heat accumulating material from supercooled condition, the releasing means having a holding member mounted on said heat storage tank in a manner such as to be capable of touching said latent heat accumulating material, a seed material made of the same type of material as said latent heat accumulating material and held by said holding member, and driving means for automatically moving said holding member to bring the seed material into contact with said heat accumulating material for a predetermined period of time and automatically moving said holding member to separate said seed material from said heat accumulating material.

2. A heat accumulator according to claim 1, wherein said holder member is mounted on the heat storage tank to be movable in a direction almost perpendicular to the liquid surface of the heat accumulating material, the holding member having a head part capable of touching the heat accumulating material, said head part holding the seed material.

3. A heat accumulator according to claim 2, wherein said holding member is formed of a porous material, and the seed material is held in a plurality of pores formed in the holding member.

4. A heat accumulator according to claim 2, wherein said driving means includes a first urging member coupled to the holding member, for urging the holding member to a no-contact position where the seed material is separated from the heat accumulating material, a second urging member coupled to the holding member and formed of a shape memory alloy, for urging the holding member to a contact position where the seed material touches the heat accumulating material when heated, heating means for heating the second urging member, and a control circuit for controlling the operation of the heating means.

5. A heat accumulator according to claim 4, wherein said heating means has a driving power source for supplying power to the second urging member.

6. A heat accumulator according to claim 4, wherein said driving means has contact detecting means for detecting contact between the seed material and the heat accumulating material, and the control circuit stops the operation of the heating means according to a detection signal from the contact detecting means.

7. A heat accumulator according to claim 6, wherein said contact detecting means has a temperature sensor for detecting the temperature of the heat accumulating material.

8. A heat accumulator according to claim 4, wherein said control circuit has a timer for stopping the operation of the heating means after passage of a specified time from when the heating means starts to operate.

9. A heat accumulator according to claim 2, wherein said driving means comprises an urging member coupled to the holding member, for urging the holding member to a no-contact position where the seed material is separated from the heat accumulating material, a magnetic piece secured to the holding member, an electromagnet which, when energized, attracts the magnetic piece, thereby moving the holding member to a contact position where the seed material touches the heat accumulating material, a power applying means for energizing the electromagnet, and a control circuit for controlling the operation of the power applying means.

10. A heat accumulator according to claim 9, wherein said driving means has contact detecting means for detecting contact between the seed material and the heat accumulating material, and the control circuit stops the operation of the power applying means according to a detection signal from the contact detecting means.

11. A heat accumulator according to claim 10, wherein said contact detecting means has a temperature sensor for detecting the temperature of the heat accumulating material.

12. A heat accumulator according to claim 4, wherein said control circuit has a timer for stopping the operation of the heating means after passage of a specified time from when the heating means starts to operate.

13. A heat accumulator comprising:

a heat storage tank;

a latent heat accumulating material filling the heat storage tank and capable of remaining in a stable supercooled condition at temperatures lower than a specified phase transformation temperature; and releasing means for releasing the latent accumulating material from a supercooled condition, the releasing means having a seed material made of the same type of material as the latent heat accumulating material, a holding member holding the seed material and supported by the heat storage tank to be movable between a contact position where the seed material touches the heat accumulating material and a no-contact position where the seed material is separated from the heat accumulating material and drive means including first moving means for moving the holding number to the contact position, and second moving means for moving the holding member to the non-contact position, and means for actuating first moving means and then actuating the second moving means.

* * * * *